(12) United States Patent
Campion et al.

(10) Patent No.: US 8,543,687 B2
(45) Date of Patent: Sep. 24, 2013

(54) MOVING DEPLOYMENT OF IMAGES BETWEEN COMPUTERS

(75) Inventors: Nicholas F. Campion, Rochester, MN (US); David J. Gimpl, Rochester, MN (US); Gregory R. Hintermeister, Rochester, MN (US); David Peraza, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 12/841,539

(22) Filed: Jul. 22, 2010

(65) Prior Publication Data
US 2012/0023222 A1    Jan. 26, 2012

(51) Int. Cl.
G06F 15/173    (2006.01)
(52) U.S. Cl.
USPC ......... 709/224; 709/201; 707/999; 707/999.1
(58) Field of Classification Search
USPC ........................................................ 709/224
See application file for complete search history.

(56) References Cited

U.S. PATENT DOCUMENTS

2003/0191795 A1* 10/2003 Bernardin et al. ............ 709/105
2006/0031248 A1*  2/2006 Vinberg et al. ........... 707/103 R
2009/0271385 A1* 10/2009 Krishnamoorthy et al. ...... 707/4

OTHER PUBLICATIONS

Stewart, "A Dollar from 15 Cents", Jun. 2008, 2008 USENIX Annual Technical Conference, USENIX website, all pages, http://static.usenix.org/event/usenix08/tech/full_papers/stewart/stewart_html/.*

* cited by examiner

Primary Examiner — Hua Fan
(74) Attorney, Agent, or Firm — Owen J. Gamon

(57) ABSTRACT

In an embodiment, a unit workload comprises an average processor speed and an average memory amount required by execution of images. If an integer multiple of the average processor speed required minus a free processor speed at a source computer is greater than a first threshold amount, an integer multiple of the average memory amount required minus a free memory amount at the source computer is greater than a second threshold amount, the integer multiple of the average processor speed required minus a processor speed requirement of a source image at the source computer is less than a third threshold amount, and the integer multiple of the average memory required minus a memory requirement of the source image at the source computer is less than a fourth threshold amount, then deployment of the source image is moved from the source computer to a destination computer.

20 Claims, 12 Drawing Sheets

| | | | | 152 |
|---|---|---|---|---|
| SERVERS DESCRIPTION ||||||
| 330 | 332 | 334 | 336 | 338 |
| NODE ID | FREE PROCESSOR SPEED | FREE MEMORY | PROCESSOR ARCHITECTURE | CLOUD ID |
| NODE A | 4000 MIPS | 6 GB | X86 | CLOUD A | 302
| NODE B | 4000 MIPS | 4 GB | X86 | CLOUD A | 304
| NODE C | 4000 MIPS | 8 GB | X86 | CLOUD A | 306
| NODE D | 200 MIPS | 4 GB | X86 | CLOUD A | 308
| NODE E | 2000 MIPS | 6 GB | X86 | CLOUD A | 310
| NODE F | 2000 MIPS | 4 GB | X86 | CLOUD A | 312
| NODE G | 1000 MIPS | 2 GB | X86 | CLOUD A | 314
| NODE H | 4000 MIPS | 8 GB | X86 | CLOUD A | 316
| NODE I | 15000 MIPS | 12 GB | X86 | CLOUD A | 318
| NODE J | 15000 MIPS | 12 GB | POWER | CLOUD B | 320

FIG. 3

RESOURCE REQUIREMENTS OF IMAGES (154)

| IMAGE ID (420) | PROCESSOR SPEED REQUIREMENT (422) | MEMORY REQUIREMENT (424) | PROCESSOR ARCHITECTURE REQUIREMENT (426) | |
|---|---|---|---|---|
| IMAGE A | 1000 MIPS | 4 GB | X86 | 402 |
| IMAGE B | 4000 MIPS | 2 GB | X86 | 404 |
| IMAGE C | 7000 MIPS | 4 GB | X86 | 406 |
| IMAGE D | 2000 MIPS | 8 GB | X86 | 408 |
| IMAGE E | 7000 MIPS | 4 GB | POWER | 410 |
| IMAGE F | 3500 MIPS | 6 GB | X86 | 412 |

FIG. 4

UNIT WORKLOAD FOR ALL USERS (158-1)

| IMAGE IDS (522) | PROCESSOR SPEED (524) | MEMORY (526) | PROCESSOR ARCHITECTURE (528) |
|---|---|---|---|
| IMAGE A, IMAGE B, IMAGE C, IMAGE D, IMAGE F | 3500 MIPS | 4.8 GB | X86 |

DEPLOYMENT HISTORY

| USER ID (730) | IMAGE ID (732) | COUNT (734) | |
|---|---|---|---|
| USER A | IMAGE A | 7 | 702 |
| USER A | IMAGE D | 1 | 704 |
| USER B | IMAGE B | 2 | 706 |
| USER B | IMAGE E | 1 | 708 |
| USER D | IMAGE B | 1 | 710 |

UNIT WORKLOAD FOR SPECIFIED USER (USER A)

| IMAGE IDS (822) | PROCESSOR SPEED (824) | MEMORY (826) | PROCESSOR ARCHITECTURE (828) |
|---|---|---|---|
| IMAGE A, IMAGE B, IMAGE C, IMAGE D, IMAGE F | 2038 MIPS | 4.6 GB | X86 |

FIG. 8

MOVING DEPLOYMENT OF IMAGES BETWEEN COMPUTERS

FIELD

An embodiment of the invention generally relates to cloud computing and more particularly to moving deployment of images between computers that are members of a cloud.

BACKGROUND

Computer systems typically comprise a combination of computer programs and hardware, such as semiconductors, transistors, chips, circuit boards, storage devices, and processors. The computer programs are stored in the storage devices and are executed by the processors.

One use of computer systems is in cloud computing, in which shared resources, such as computer programs and data stored on computer servers organized as members of a cloud are provided to client computers and other devices on-demand, analogous to a public utility, such as an electricity or telephone company. The cloud typically has multiple computer servers called nodes, which are managed as a group and which share similar properties. The similar properties of nodes within a cloud allow tasks, which need to be repeated on many nodes, such as installing or deploying programs, often called images, to be applied to a group of nodes. Similar properties of nodes within a cloud also allow images to be installed or deployed to any node within a cloud or moved between nodes in a cloud without modifying the image.

SUMMARY

A method, computer-readable storage medium, and computer system are provided. In an embodiment, a unit workload is calculated. The unit workload comprises an average processor speed and an average memory amount required by execution of images. If an integer multiple of the average processor speed required by the execution of the images minus a free processor speed at a source computer is greater than a first threshold amount, an integer multiple of the average memory amount required by the execution of the images minus a free memory amount at the source computer is greater than a second threshold amount, the integer multiple of the average processor speed required minus a processor speed requirement of a source image at the source computer is less than a third threshold amount, and the integer multiple of the average memory required minus a memory requirement of the source image at the source computer is less than a fourth threshold amount, then deployment of the source image is moved from the source computer to a destination computer.

BRIEF DESCRIPTION OF THE SEVERAL VIEWS OF THE DRAWINGS

FIG. 3 depicts a block diagram of an example data structure for a servers description, according to an embodiment of the invention.

FIG. 4 depicts a block diagram of an example data structure for resource requirements, according to an embodiment of the invention.

FIG. 5 depicts a block diagram of an example data structure for a unit workload for all users, according to an embodiment of the invention.

FIG. 7 depicts a block diagram of an example data structure for a deployment history, according to an embodiment of the invention.

FIG. 8 depicts a block diagram of an example data structure for a unit workload for a specified user, according to an embodiment of the invention.

It is to be noted, however, that the appended drawings illustrate only example embodiments of the invention, and are therefore not considered a limitation of its scope, for the invention may admit to other equally effective embodiments.

DETAILED DESCRIPTION

Figure 1:
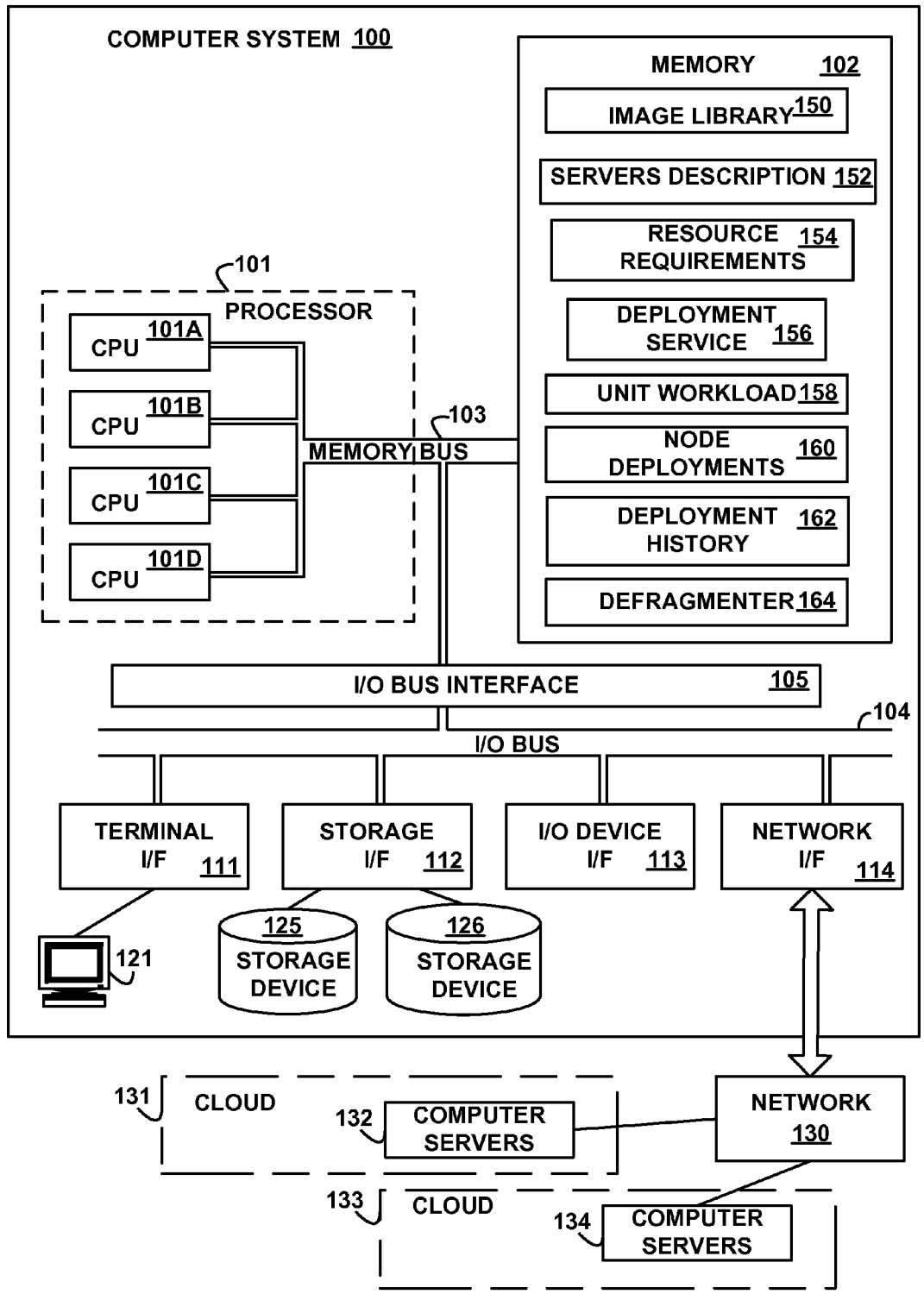
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to clouds 131 and 133 of respective computer servers 132 and 134 via a network 130, according to an embodiment of the present invention. The major components of the computer system 100 include one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory, storage device, or storage medium for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes an image library 150, a servers description 152, resource requirements 154, a deployment service 156, a unit workload 158, node deployments 160, a deployment history 162, and a defragmenter 164. Although the image library 150, the servers description 152, the resource requirements 154, the deployment service 156, the unit workload 158, the node deployments 160, the deployment history 162, and the defragmenter 164 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the image library 150, the servers description 152, the resource requirements 154, the deployment service 156, the unit workload 158, the node deployments 160, the deployment history 162, and the defragmenter 164 are illustrated as being contained within the main memory 102, these elements are not necessarily all completely contained in the same storage device at the same time. Further, although the image library 150, the servers description 152, the resource requirements 154, the deployment service 156, the unit workload 158, the node deployments 160, the deployment history 162, and the defragmenter 164 are illustrated as being separate entities, in other embodiments some of them, portions of some of them, or all of them may be packaged together.

The image library 150 comprises images, which comprise executable programs, methods, procedures, routines, classes, objects, instructions, or statements. The deployment service 156 or another program deploys or sends the images to computer servers 132 and 134, where the images are stored in memory and installed, configured, and executed on the processors of the computer servers 132 and 134. In various embodiments, some or all of the computer servers 132 and 134 receive the same images from the image library 150. In other embodiments, some or all of the computer servers 132 and 134 receive different images from the image libraries 150.

The servers description 152 describes the attributes and free or available resources (e.g., memory, processors, storage devices, and network bandwidth) of the computer servers 132 and 134. The images from the library 150 use the free resources during execution at the computer servers 132 and 134. The resource requirements 154 specifies the amount of the free resources at the servers 132 and 134 that the images need and the type or attributes of the computer servers 132 and 134 that the images need or use, in order to execute on the processors of the computer servers 132 and 134.

The deployment service 156 calculates the unit workload 158 and the node deployments 160. The unit workload 158 describes, for all users or for a specified user, the average resource requirements of an average image in the image library 150. The node deployments 160 describes the number of the average images that are deployable to the servers. The deployment history 162 describes a history of various images that various users have deployed to the servers 132 and 134. The defragmenter 164 determines whether to un-deploy or remove images in the image library 150 from the computer servers 132 and 134 and whether to move images between the computer servers 132 and 134.

In various embodiments, one, some, or all of the image library 150, the deployment service 156, and the defragmenter 164 include instructions or statements that execute on the processor 101 or instructions or statements that are interpreted by instructions or statements that execute on the processor 101, to carry out the functions as further described below with reference to FIGS. 9, 10, 11, 12, 13, and 14. In an embodiment, one, some, or all of the image library 150, the deployment service 156, and the defragmenter 164 are implemented in hardware via semiconductor devices, chips, logical gates, circuits, circuit cards, and/or other physical hardware devices in lieu of, or in addition to, a processor-based system.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user input/output devices 121, which may include user output devices (such as a video display device, speaker, printer, and/or television set) and user input devices (such as a keyboard, mouse, keypad, touchpad, trackball, buttons, light pen, or other pointing device). A user may manipulate the user input devices, in order to provide input to the user input/output device 121 and the computer system 100 via a user interface, and may receive output via the user output devices. For example, a user interface may be presented via the user input/output device 121, such as displayed on a display device, played via a speaker, or printed via a printer.

The storage interface unit 112 supports the attachment of one or more direct access storage devices (DASD) 125 and 126 (which are typically rotating magnetic disk drive storage devices, although they could alternatively be other devices, including arrays of disk drives configured to appear as a single large storage device to a host). In another embodiment, the devices 125 and/or 126 may be implemented via any type of secondary storage device. The contents of the main memory 102, or any portion thereof, may be stored to and retrieved from the direct access storage devices 125 and 126, as needed.

The I/O device interface 113 provides an interface to any of various other input/output devices or devices of other types, such as printers or fax machines. The network adapter 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 may be a multi-user "mainframe" computer system, a single-user system, or a server or similar device that has little or no direct user interface, but receives requests from other computer systems (clients). In other embodiments, the computer system 100 may be implemented as a desktop computer, portable computer, laptop or notebook computer, tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network, cell-based radio network. In still another embodiment, the network 130 may be any suitable network or combination of networks. Although one network 130 is shown, in other embodiments any number of networks (of the same or different types) may be present.

The cloud 131 comprises computer servers 132, which share common attributes, such as a type of processor that executes images received from the image library 150. The cloud 133 comprises computer servers 134, which share common attributes. The computer servers 132 and 134 may include some or all of the hardware and/or program components previously described above for the computer system 100.

It should be understood that FIG. 1 is intended to depict the representative major components of the computer system 100, the network 130, and the clouds 131 and 133 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the computer systems 100, 132, and 134 and that, when read and executed by one or more processors in the computer system 100, 132, and 134 or when interpreted by instructions that are executed by one or more processors, cause the computer systems 100, 132, and 134 to perform the actions necessary to execute steps or elements comprising the various aspects of embodiments of the invention.

As will be appreciated by one skilled in the art, aspects of embodiments of the present invention may be embodied as a system, method, or computer program product. Accordingly, aspects of embodiments of the present invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Furthermore, embodiments of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible non-transitory medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device.

Program code embodied on a computer-readable medium may be transmitted using any appropriate medium, including but not limited to, wireless, wire line, optical fiber cable, Radio Frequency (RF), or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks. The computer programs defining the functions of various embodiments of the invention may be delivered to a computer system via a variety of tangible computer-readable storage media that may be operatively or communicatively connected (directly or indirectly) to the processor or processors.

The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the present invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or program environments may be used without departing from the scope of embodiments the invention.

Figure 2:
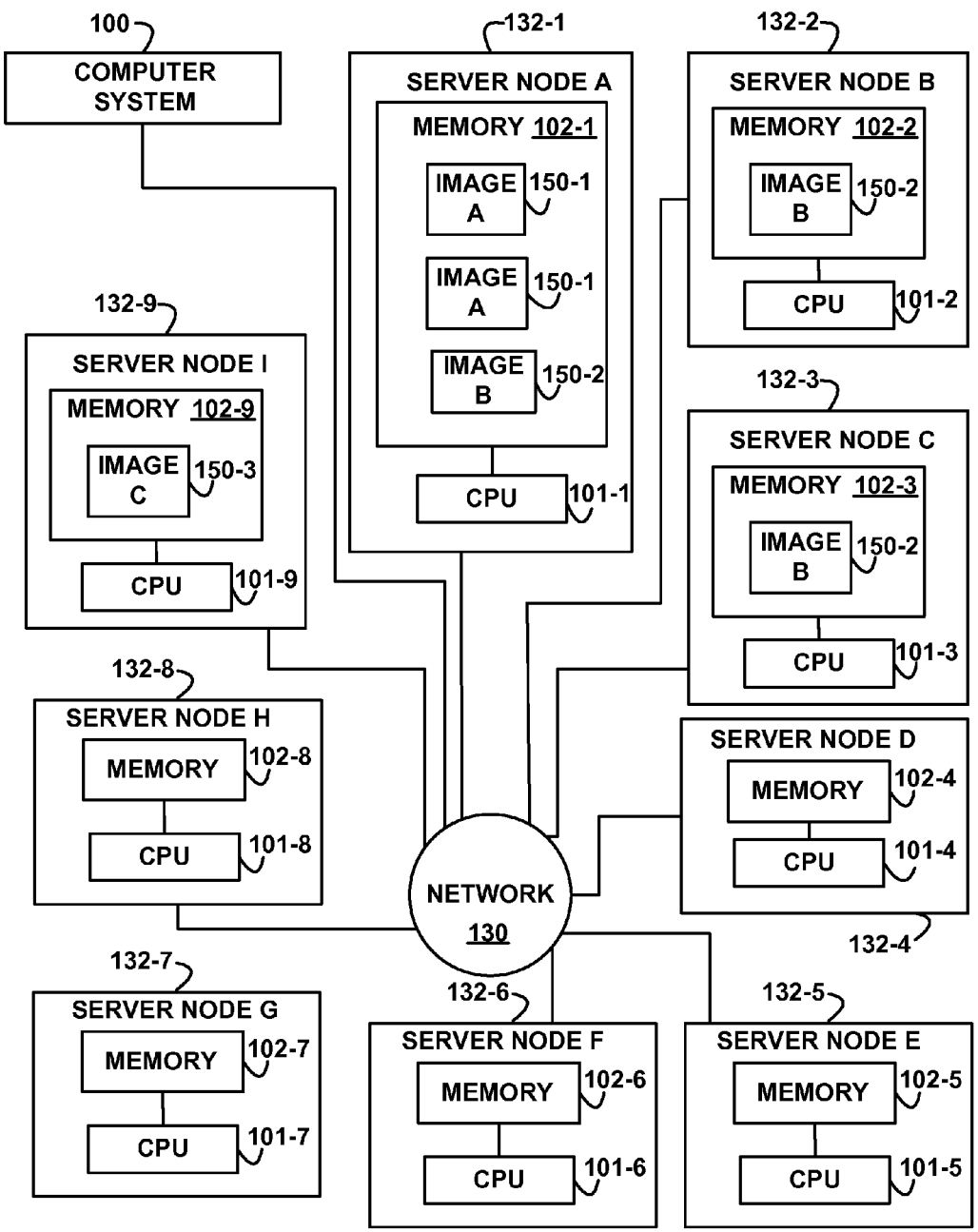
FIG. 2 depicts a block diagram illustrating servers connected via a network, according to an embodiment of the invention.

FIG. 2 depicts a block diagram illustrating an example deployment of images from the image library to computer servers connected via a network, according to an embodiment of the invention. FIG. 2 illustrates the computer system 100 and server computer system nodes 132-1, 132-2, 132-3, 132-4, 132-5, 132-6, 132-7, 132-8, and 132-9 connected via the network 130. The server computer system nodes 132-1, 132-2, 132-3, 132-4, 132-5, 132-6, 132-7, 132-8, and 132-9 are examples of, and are generically referred to by, the computer system 132 (FIG. 1). Each of the server computer system nodes 132-1, 132-2, 132-3, 132-4, 132-5, 132-6, 132-7, 132-8, and 132-9 comprises a respective processor 101-1, 101-2, 101-3, 101-4, 101-5, 101-6, 101-7, 101-8, and 101-9 connected to respective memory 102-1, 102-2, 102-3, 102-4, 102-5, 102-6, 102-7, 102-8, and 102-9 via a respective bus. Each of the processors 101-1, 101-2, 101-3, 101-4, 101-5, 101-6, 101-7, 101-8, and 101-9 is an example of, and is generically referred to by the processor 101 (FIG. 1). Each of the memory 102-1, 102-2, 102-3, 102-4, 102-5, 102-6, 102-7, 102-8, and 102-9 is an example of, and is generically referred to by the memory 102 (FIG. 1).

The memory 102-1 in the server computer system node 132-1 stores two copies of the image A 150-1 and one copy of the image B 150-2, which execute on the processor 101-1 and use or consume resources of the server computer system node 132-1 that were free prior to the deployment of the images to the server computer system node 132-1. The memory 102-2 in the server computer system node 132-2 stores the image B 150-2, which executes on the processor 101-2 and uses or consumes resources of the server computer system node 132-2. The memory 102-3 in the server computer system node 132-3 stores the image B 150-2, which executes on the processor 101-3 and uses or consumes resources of the server computer system node 132-3. The memory 102-9 in the server computer system node 132-9 stores the image C 150-3, which executes on the processor 101-9 and uses or consumes resources of the server computer system node 132-9. The images 150-1, 150-2, and 150-3 are subsets of the image library 150 (FIG. 1).

FIG. 3 depicts a block diagram of an example data structure for the servers description 152, according to an embodiment of the invention. The servers description 152 comprises example entries 302, 304, 306, 308, 310, 312, 314, 316, 318, and 320, each of which comprises an example node identifier field 330, an example free processor speed field 332, an example free memory field 334, an example processor architecture field 336, and an example cloud identifier field 338.

The node identifier field 330 identifies a computer server node, such as the computer server 132 or 134. The free processor speed field 332 specifies the amount of free, unused, or unallocated processor speed (at the computer system node identified by the node identifier 330 in the same entry) that is available for use or available to be allocated to an image that is not yet deployed, installed, or executing at the computer system node. In an embodiment, the free processor speed for a server computer system node equals the total processor speed at the server computer system node minus the sum of the processor speed requirements for all images currently installed or deployed at the server computer system node, regardless of how much of the total processor speed the currently deployed and installed images actually use. In another embodiment, the free processor speed 332 for a server computer system node equals the total processor speed at the server computer system node minus the sum of the amount of processor speed currently used by the images installed, deployed, and executing at the server computer system node. In various embodiments, the free processor speed 332 is expressed in units of an executable instructions rate (e.g., instructions executed per second or any multiple thereof), a clock frequency (e.g., hertz or any multiple thereof), or an executable floating point operations rate (e.g., floating point operations per second or any multiple thereof).

The free memory field 334 specifies the amount of free, unused, or unallocated memory (at the computer system node identified by the node identifier 330 in the same entry) that is available for use or available to be allocated to an image that is not yet deployed, installed, or executing at the computer system node. The free memory 334 for a server computer system node equals the amount of installed memory at the server computer system node minus the sum of the memory requirements for all images currently installed at the server computer system node, regardless of how much memory the currently installed images actually use. In another embodiment, the free memory 334 for a server computer system node equals the total amount or quantity of memory at the server computer system node minus the sum of the amount of memory currently used by the images installed, deployed, and executing at the server computer system node.

The processor architecture field 336 specifies the type of architecture of the processors (or the type of the instruction set that the processors execute) that are installed at the server computer system node (identified by the node identifier 330 in the same entry). The cloud identifier field 338 specifies the cloud 131 or 133 of which the computer server node (identified by the node identifier 330 in the same entry) is a member. In an embodiment, all computer system nodes that are members of the same cloud comprise processors with the same processor architecture, and computer system nodes that are members of different clouds may have, but are not necessarily required to have, different processor architectures.

FIG. 4 depicts a block diagram of an example data structure for the resource requirements 154, according to an embodiment of the invention. In an embodiment, the data structure for resource requirements 154 is implemented in the Open Virtual Machine Format (OVF), but any other embodiments any appropriate format, organization, or structure may be used. The example resource requirements 154 comprises example entries 402, 404, 406, 408, 410, and 412, each of which comprises an example image identifier field 420, a processor speed requirement field 422, a memory requirement field 424, and a processor architecture requirement field 426.

The image identifier field 420 specifies an image in the image library 150. The processor speed requirement field 422 specifies the amount of processor speed that is needed by the image (identified by the image identifier 420 in the same entry) when the image is installed at a server computer system node. In various embodiments, the processor speed requirement field 422 specifies the maximum processor speed that the image needs, the minimum processor speed that the image needs, or the average processor speed that the image needs in order to execute.

The memory requirement field 424 specifies the amount of memory that is needed by the image (identified by the image identifier 420 in the same entry) when the image is installed at a server computer system node. In various embodiments, the memory requirement field 424 specifies the maximum amount of memory that the image needs, the minimum amount of memory that the image needs, or the average amount of memory that the image needs in order to execute. The processor architecture requirement 426 specified the type of processor architecture that the image (identified by the image identifier 420 in the same entry) needs in order to execute at a server computer system node. The entries 402, 404 406, 408, 410, and 412 represent the resource requirements for all of the images in the image library 150, regardless of whether the images are actually deployed, installed, configured, and executing at the computer servers or not actually deployed, installed, configured and executing at the computer servers.

FIG. 5 depicts a block diagram of an example data structure for a unit workload 158-1 for all users, according to an embodiment of the invention. The unit workload 158-1 is an example of, and is generically referred to by, the unit workload 158 (FIG. 1). The unit workload 158-1 comprises an image identifier field 522, a processor speed field 524, a memory field 526, and a processor architecture field 528. The image identifier field 522 specifies the images in the image library 150 that are represented by the unit workload 158-1. The processor speed field 524 specifies the average processor speed required by execution of the images specified by the image identifier field 522. The memory field 526 specifies the average memory amount required by execution of the images specified by the image identifier field 522. The processor architecture field 528 specifies the processor architecture that is required by the images specified by the image identifiers 522, in order for the images to execute.

The unit workload 158-1 describes, for all users (regardless of which user requested the deployment of the images identified by the image identifiers 522), the average resource requirements (the average required processor speed 524 and the average amount of memory 526 required) for the images identified by the image identifiers 522 to execute on a processor in a server computer system node. The image identifiers 522 identify images in the image library 150 that are members of the same cloud or that execute on a processor having the same processor architecture.

Figure 6:
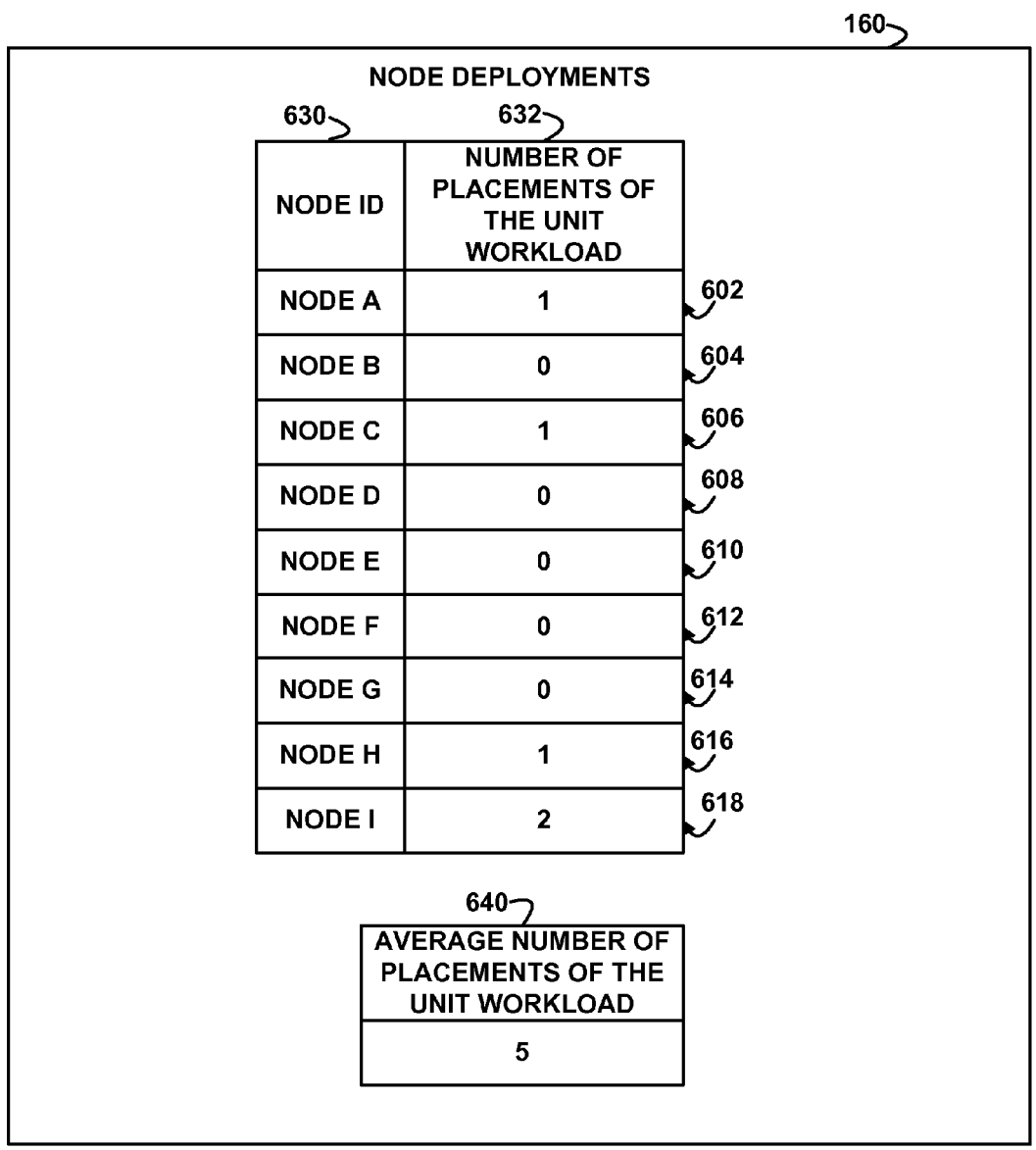
FIG. 6 depicts a block diagram of an example data structure for node deployments, according to an embodiment of the invention.

FIG. 6 depicts a block diagram of an example data structure for the node deployments 160, according to an embodiment of the invention. The node deployments 160 include example entries 602, 604, 606, 608, 610, 612, 614, 616, and 618, each of which includes an example node identifier field 630 and number of placements field 632. The node identifier field 630 identifies a server computer node, such as the computer servers 132 or 134. The number of placements field 632 specifies the number of the images with average resource requirements represented by the unit workload 158 that are deployable to the server computer node identified by the node identifier 630 in the same entry. That is, the number of placements field 632 identifies the number of average images with an average processor speed requirement and an average memory requirement that can be deployed to the server computer system (identified by the node identifier 630 in the same entry) and whose deployment would not consume more than the available or free resources at that node.

Stated another way, the node deployments 160 identifies the count or number of the average images (having the unit workload's average processor speed requirement and average memory requirement) that can be deployed, installed, and executed at each server computer node. Thus, the server computer nodes 630 have enough free processor speed and free memory to deploy, install, and execute the number 632 of average images in the same entry. The number of placements 632 specifies a count or number of the average images (described by the unit workload 158) that can be deployed, installed, and executed on the server (in the same entry) using the free processor speed 332 and free memory 334, meaning that the number of placements 632 multiplied by the processor speed requirement 524 in the unit workload 158 is less than or equal to the free processor speed 332 of the respective node and the number of placements 632 multiplied by the memory 526 in the unit workload 158 is less than or equal to the free memory 334 of the respective node. The average number of placements 640 is the sum of the number of placements 632 for all server computer nodes (for all entries 602, 604, 606, 608, 610, 612, 614, 616, and 618). Thus, the average number of placements 640 indicates the number of the unit workloads 158 (having average resource requirements) that can be deployed (are deployable) using the free resources that are available in all of the server computer nodes.

FIG. 7 depicts a block diagram of an example data structure for a deployment history 162, according to an embodiment of the invention. The deployment history 162 comprises example entries 702, 704, 706, 708, and 710, each of which comprises an example user identifier field 730, an image identifier field 732, and a count field 734. The user identifier field 730 identifies a user who requested deployment, installation, configuration, and/or execution of an image from the image library 150 identified by the image identifier field 732 (in the same entry) to any server computer system. The count field 734 identifies a count of the number of times that the image identified by the image identifier 732 in the same entry was requested to be deployed, installed, configured, and/or executed by the user identified by the user identifier 730 (in the same entry) at times prior to the current time.

FIG. 8 depicts a block diagram of an example data structure for a unit workload 158-2 for a particular specified user, according to an embodiment of the invention. The unit workload 158-2 is an example of, and is generically referred to by, the unit workload 158 (FIG. 1). In the example data of FIG. 8, the specified user is user A, but the specified user may be any user identified or specified by a command or request. The unit workload 158-2 comprises an image identifier field 822, a processor speed field 824, a memory field 826, and a processor architecture field 828. The image identifier field 822 specifies the images in the image library 150 that are represented by the unit workload 158-2. The processor speed field 824 specifies the weighted average processor speed requirement of the images specified by the image identifier field 822. The memory field 826 specifies the weighted average memory requirements of the images specified by the image identifier field 822. The processor architecture field 828 specifies the processor architecture that is required by the images specified by the image identifiers 822, in order for the images to execute. The weighted averages are weighted in proportion to the number of times (a zero number of times still receives some weight) that a user requested deployment of the images.

The unit workload 158-2 describes, for one specified user that requested the deployment of all of the images identified by the image identifiers 822, the weighted average resource requirements (the weighted average required processor speed 824 and the weighted average amount of memory 826 required) of the images identified by the image identifiers 822. The image identifiers 822 identify images in the image library 150 that are members of the same cloud or that execute on a processor having the same processor architecture. The deployment service 156 calculates the unit workload 158-2 from the deployment history 162 for the specified example user A (represented by the example data of the entries 702 and 704 in the deployment history 162 of FIG. 7) and from the resource requirements 154 of the images (represented by the example data in FIG. 4). The deployment service 156 performs this calculation, giving some weight or significance to all the images in the image library 150 that require the processor architecture of a specified cloud (even if not actually deployed by the specified user), and also gives weight or significance to the specified user's actually deployment of images to the specified cloud. If the specified user has not deployed any images to the specified cloud, then the unit workload 158-2 is identical to the unit workload 158-1. But, as the specified user requests the deployment of more images to the specified cloud, the deployment history 162 of the specified user becomes more significant to the calculation that the deployment service 156 performs in creating the unit workload 158-2, which becomes more tailored or specific to the deployment history 162 of the specified user.

Using the user A's example deployment history (illustrated in the entries 702 and 704 of the deployment history 162 of FIG. 7, the deployment service 156 performs the following calculations, in order to create the unit workload 158-2 for the specified example user A. Image A: 1000 MIPS*8=8000 MIPS; 4 GB*8=32 GB Memory. Image B: 4000 MIPS*1=4000 MIPS; 2 GB*1=2 GB Memory. Image C: 7000 MIPS*1=7000 MIPS; 4 GB*1=4 GB Memory. Image D: 2000 MIPS*2=4000 MIPS; 8 GB*2=16 GB Memory. Image F: 3500 MIPS*1=3500 MIPS; 6 GB*1=6 GB Memory. Total processor speed: 8000+4000+7000+4000+3500=26,500 MIPS. Total memory: 32+2+4+16+6=60 GB Memory.

The deployment service 156 uses 8 as a weighting factor for image A because the user A deployed the image A 7 times (entry 702 in FIG. 7) and the deployment service 156 adds 1 to the number of actual number of deployments by the user, in order to give all images with a processor architecture requirement that matches (is identical to) the processor architecture of the specified cloud, regardless of whether actually deployed, some weight or significance in the calculation. The deployment service 156 uses 1 as a weighting factor for image B because the user A deployed the image B zero times (no entry exists in FIG. 7 for the user A and the image B), and the deployment service 156 adds 1 to the number of actual deployments by the user, in order to give all images, regardless of whether actually deployed, some weight or significance in the calculation. The deployment service 156 uses 1 as a weighting factor for image C because the user A deployed the image C zero times (no entry exists in FIG. 7 for the user A and the image C) and the deployment service 156 adds 1 to the number of actual deployments by the user. The deployment service 156 uses 2 as a weighting factor for image D because the user A deployed the image D one time (entry 704 in FIG. 7), and the deployment service 156 adds 1 to the number of actual deployments by the user. The deployment service 156 uses 1 as a weighting factor for image F because the user A deployed the image F zero times (no entry exists in FIG. 7 for the user A and the image F), and the deployment service 156 adds 1 to the number of actual deployments by the user.

The total number of deployments=13=8+1+1+2+1. Five out of the total number of deployments are the default weight given to all images regardless of whether or not the user deployed them, and eight of the total number of deployments (7 in the entry 702 and 1 in the entry 704 of FIG. 7) are the deployments requested by the user A. The deployment service 156 calculates the unit workload processor speed 824 as the total processor speed divided by the total number of deployments: 26,500 MIPs/13 deployments=2038 MIPs/deployment. The deployment service 156 calculates the unit workload memory 826 to be the total memory amount divided by the total number of deployments: 60 GB/13 deployments=4.6 GB/deployment.

Figure 9:
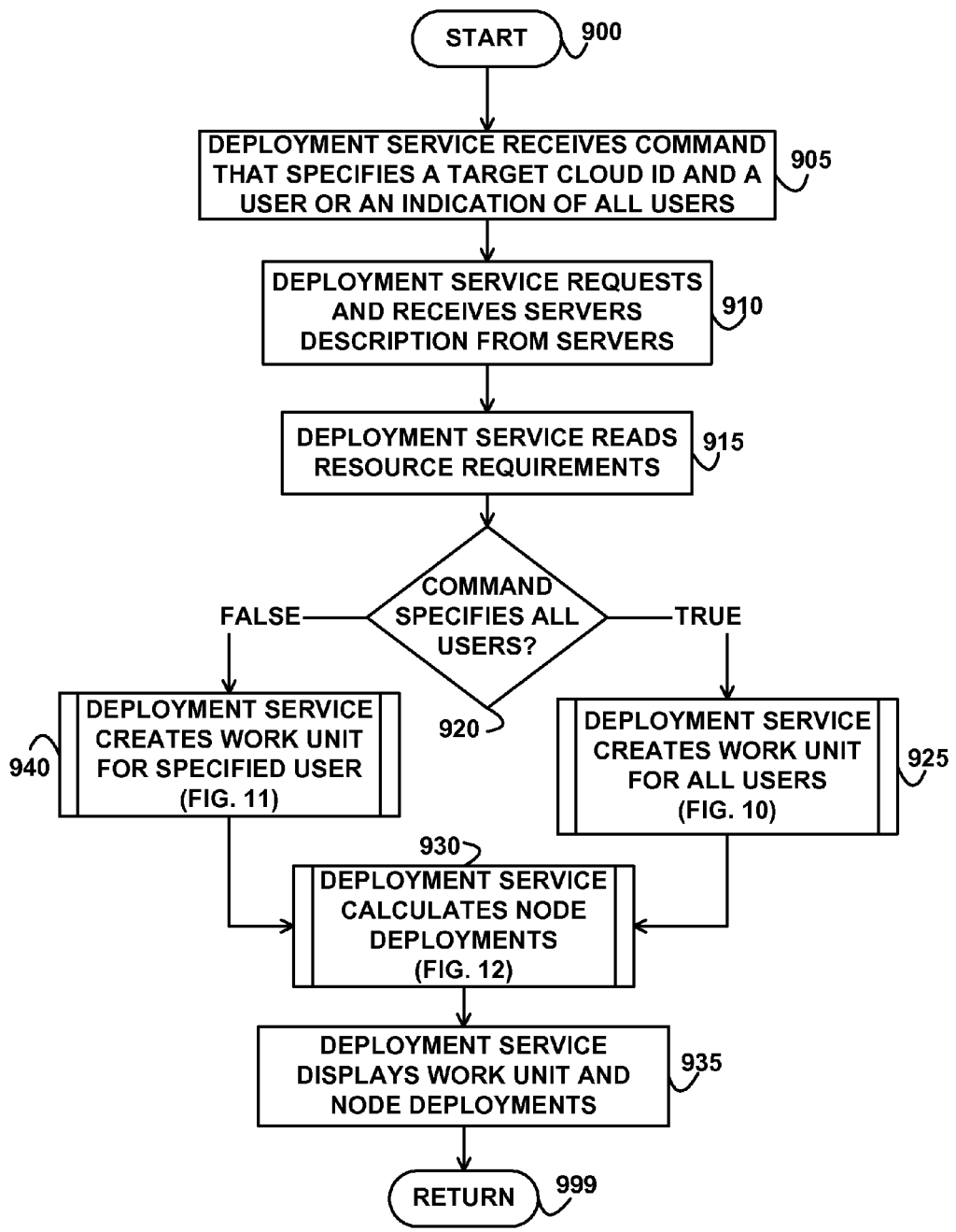
FIG. 9 depicts a flowchart of example processing for creating a unit workload and node deployments, according to an embodiment of the invention.

FIG. 9 depicts a flowchart of example processing for creating a unit workload and node deployments, according to an embodiment of the invention. Control begins at 900. Control then continues to block 905 where the deployment service 156 receives a command from a user interface via the user interface device 121 that specifies a target cloud identifier and a specified user or an indication of all users. Control then continues to block 910 where the deployment service 156 requests and receives the servers description 152 from the server computer systems and stores the servers description 152 in the memory 102 of the computer system 100. Control then continues to block 915 where the deployment service 156 reads the resource requirements 154 from the memory 102.

Control then continues to block 920 where the deployment service 156 determines whether the received command specifies that the work unit 158 is requested to describe the average image deployed by all users. If the determination at block 920 is true, then the received command specifies that the work unit is requested to describe the average image deployed by all users, so control continues to block 925 where the deployment service 156 creates a work unit for all users (e.g., the work unit 158-1), as further described below with reference to FIG. 10. Control then continues to block 930 where the deployment service 156 calculates the node deployments 160, as further described below with reference to FIG. 12. Control then continues to block 935 where the deployment service 156 presents or displays the created work unit 158 and the created node deployments 160 via the user I/O device 121. Control then continues to block 999 where the logic of FIG. 9 returns.

If the determination at block 920 is false, then the received command specifies that the work unit is requested to describe the average image deployed by a specific user, so control continues to block 940 where the deployment service 156 creates a work unit for the specified user (e.g., the work unit 158-2), as further described below with reference to FIG. 11. Control then continues to block 930 where the deployment service 156 calculates the node deployments 160 using the work unit for the specified user 158-2, as further described below with reference to FIG. 12. Control then continues to block 935 where the deployment service 156 presents or displays the calculated work unit 158-2 and the node deployments 160. Control then continues to block 999 where the logic of FIG. 9 returns. The logic of FIG. 9 may be invoked any number of times in response to any number of different commands received at block 905.

Figure 10:
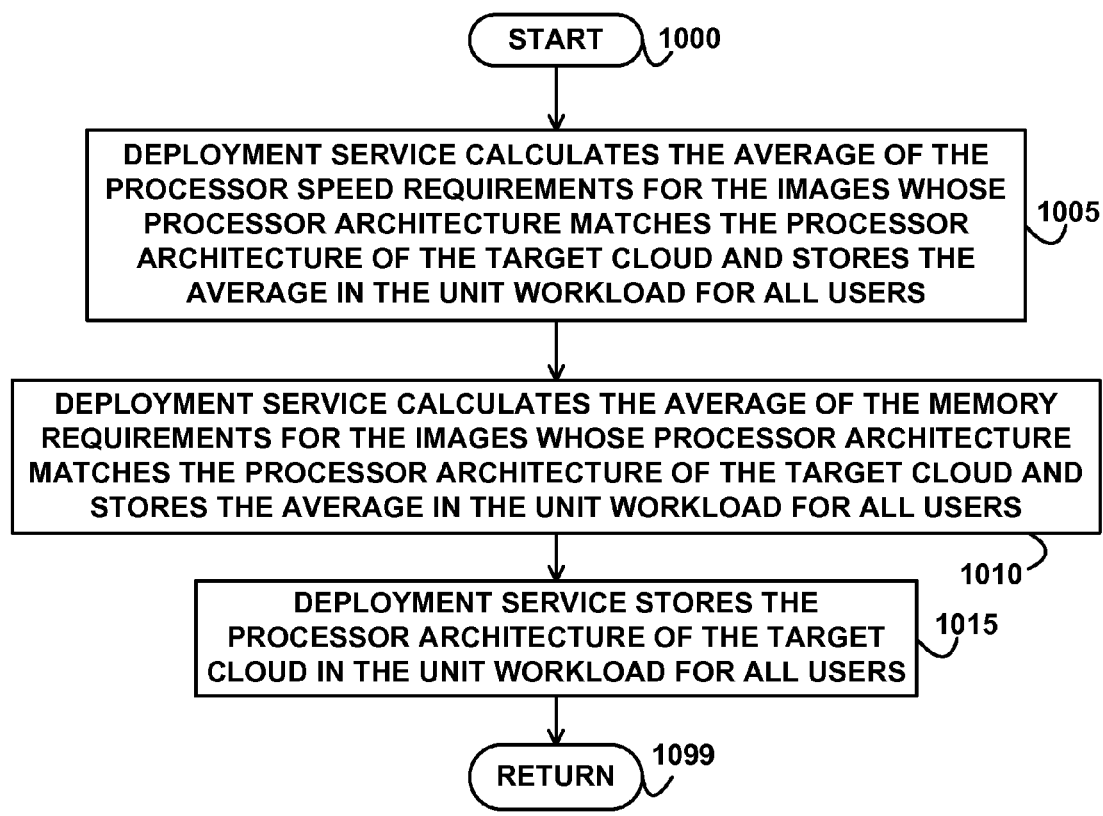
FIG. 10 depicts a flowchart of example processing for creating a unit workload for all users, according to an embodiment of the invention.

FIG. 10 depicts a flowchart of example processing for creating a unit workload for all users, according to an embodiment of the invention. Control begins at block 1000. Control then continues to block 1005 where the deployment service 156 calculates the average of the processor speed requirements 422 for all entries in the resource requirements 154 whose processor architecture matches the processor architecture in the target cloud identified by the target cloud identifier specified by the received command and stores the average processor speed 524 in the unit workload 158-1 for all users. Control then continues to block 1010 where the deployment service 156 calculates the average of the memory requirements 424 in all entries in the resource requirements 154 whose processor architecture 426 matches the processor architecture in the target cloud identified by the target cloud identifier specified by the received command and stores the average in the memory requirements 526 in the unit workload 158-1 for all users. Control then continues to block 1015 where the deployment service 156 stores the processor architecture of the target cloud identified by the target cloud identifier in the processor architecture 528 in the unit workload 158-1 for all users. The deployment service 156 further sets the image identifiers used by the calculations of FIG. 10 into the image identifiers 522 of the unit workload 158-1. Control then continues to block 1099 where the logic of FIG. 10 returns.

Figure 11:
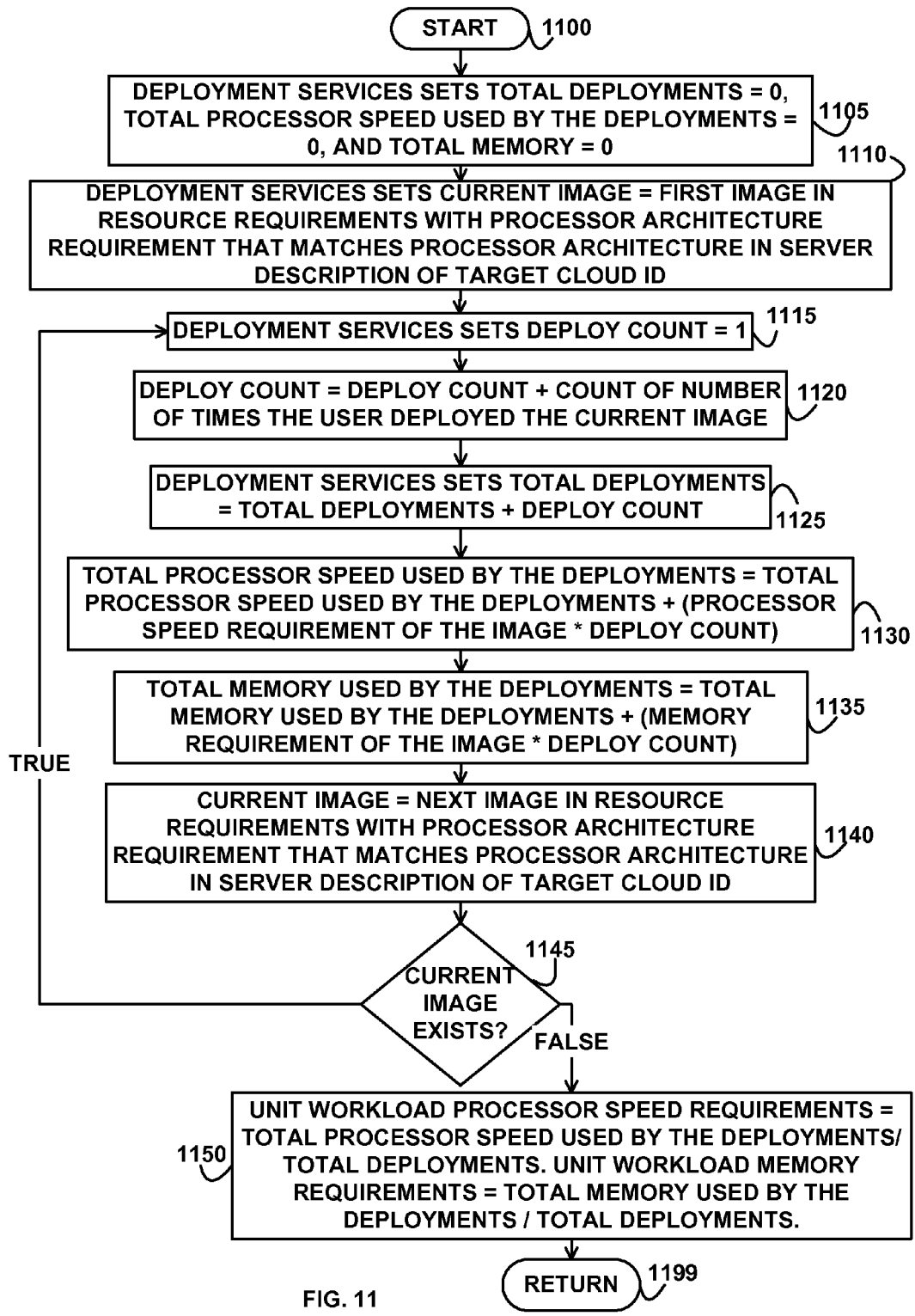
FIG. 11 depicts a flowchart of example processing for creating a unit workload for a specified user, according to an embodiment of the invention.

FIG. 11 depicts a flowchart of example processing for creating a unit workload for a specified user who requested deployment of images, according to an embodiment of the invention. Control begins at block 1100. Control then continues to block 1105 where the deployment service 156 sets the total number of deployments to be zero, sets the total processor speed used by the deployments to be zero, and sets the total memory used by the deployments to be zero. The total number of deployments is a temporary variable in memory or in a register that represents a count of the number of deployments of images requested by the specified user, aggregated across all images. The total number of deployments also includes a default weight given to all images, regardless of whether or not the specified user deployed them. Control then continues to block 1110 where the deployment service 156 sets the current image to be the first image in the resource requirements 154 with a processor architecture requirement 426 that matches the processor architecture 336 that is specified in the entries in the servers description 152 that contain cloud identifiers 338 that match the received target cloud identifier.

Control then continues to block 1115 where the deployment service 156 sets the deploy count to be one, which is the default weight given to all images, regardless of whether or not the specified user deployed them. The deploy count is a temporary variable in memory or in a register that represents a count of the number of deployments of the current images requested by the specified user. The deploy count also includes the default weight given to all images, regardless of whether or not the specified user deployed them. Control then continues to block 1120 where the deployment service 156 sets the deploy count to be the deploy count plus the count 734 of the number of times that the user deployed the current image. That is, the deployment service 156 finds the entry in the deployment history 162 with a user identifier 730 that matches the specified user and an image identifier 732 that matches the current image and reads the count 734 from that entry. If no such matching entry exists, the deployment service 156 uses zero for the count 734.

Control then continues to block 1125 where the deployment service 156 sets the total number of deployments to be the total number of deployments plus the deploy count. Thus, the deployment service 156 aggregates the total number of deployments across all images. Control then continues to block 1130 where the deployment service 156 sets the total processor speed used by the deployments to be the total processor speed used by the deployments plus (the processor speed requirement 422 of the current image multiplied by the deploy count). The deployment service 156 finds the processor speed requirement 422 of the current image by comparing the identifier of the current image to the image identifier 420, finding the entry in the resource requirements 154 whose image identifier 420 matches the identifier of the current image, and reading the processor speed requirement 422 from that entry.

Control then continues to block 1135 where the deployment service 156 sets the total memory used by the deployments equal to the total memory used by the deployments plus (the memory requirement 424 of the current image multiplied by the deploy count). The deployment service 156 finds the memory requirement 424 of the current image by comparing the identifier of the current image to the image identifier 420, finding the entry in the resource requirements 154 whose image identifier 420 matches the identifier of the current image, and reading the memory requirement 424 from that entry.

Control then continues to block 1140 where the deployment service 156 sets the current image to be the next image in the resource requirements 154 with a processor architecture requirement 426 that matches the processor architecture 336 that is specified in the entries in the servers description 152 that contain cloud identifiers 338 that match the received target cloud identifier. Control then continues to block 1145 where the deployment service 156 determines whether the current image exists. If the determination at block 1145 is true, then the current image exists and not all images have been processed by the logic of FIG. 11, so control returns to block 1115 where the deployment service 156 begins processing the next current image, as previously described above. If the determination at block 1145 is false, then the current image does not exist and all images have been processed by the logic of FIG. 11, so control continues to block 1150 where the deployment service 156 sets the unit workload processor speed requirements 824 to be the total processor speed used by the deployments divided by the total number of deployments. The deployment service 156 further sets the unit workload memory requirements 826 to be the total memory used by the deployments divided by the total number of deployments. The deployment service 156 further sets the processor architecture 828 to be the processor architecture 336 that is specified in the entries in the servers description 152 that contain cloud identifiers 338 that match the received target cloud identifier. The deployment service 156 further sets the image identifiers used by the calculations of FIG. 11 into the image identifiers 822 of the unit workload 158-2. Control then continues to block 1199 where the logic of FIG. 11 returns.

Figure 12:
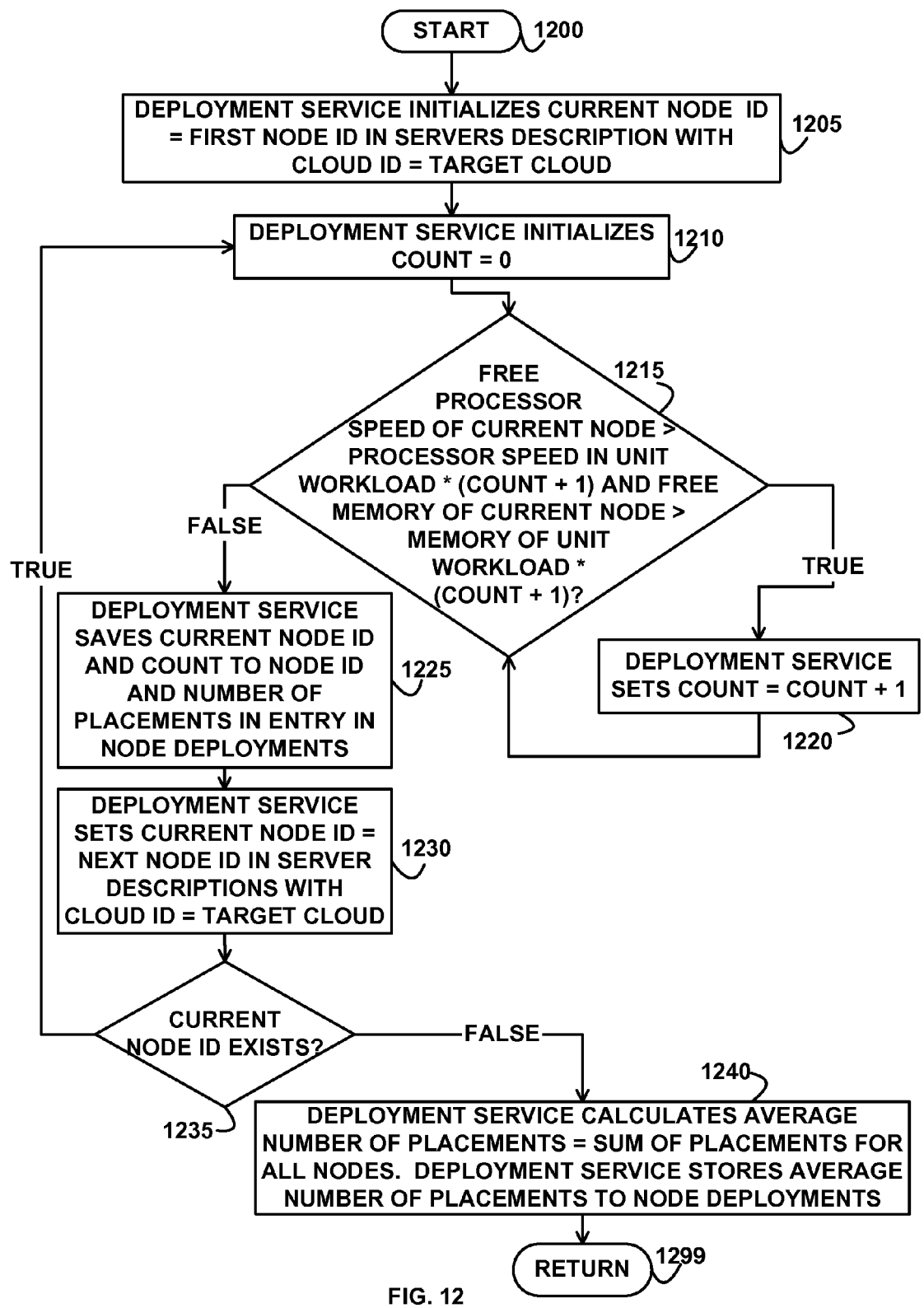
FIG. 12 depicts a flowchart of example processing for calculating node deployments, according to an embodiment of the invention.

FIG. 12 depicts a flowchart of example processing for calculating the node deployments, according to an embodiment of the invention. Control begins at block 1200. Control then continues to block 1205 where the deployment service 156 initializes the current node identifier to be the first computer system node identifier in the servers description 152 that has a cloud identifier 338 in the same entry that is equal to the target cloud identifier. Control then continues to block 1210 where the deployment service 156 initializes the count to be zero. The count is an internal or temporary variable in memory or in a register that represents a count of the number of placements of the unit workload 158 that are deployable to a server computer system node.

Control then continues to block 1215 where the deployment service 156 determines whether the free processor speed 332 of the current node is greater than the processor speed 524 or 824 in the unit workload 158 multiplied by (the count plus one) and the free memory 334 of the current node is greater than [the memory requirement 526 or 826 of the unit workload 158 multiplied by (the count plus one)]. If the determination at block 1215 is true, then the free processor speed 332 of the current node is greater than the processor speed requirement 524 or 824 in the unit workload 158 multiplied by (the count plus one) and the free memory 334 of the current node is greater than [the memory requirement 526 or 826 of the unit workload 158 multiplied by (the count plus one)], so control continues to block 1220 where the deployment service 156 increments the count by one. Control then returns to block 1215 where the deployment service 156 performs the processing previously described above.

The deployment service 156 continues in the loop of blocks 1215 and 1220 until the deployment service 156 determines, at block 1215 that the free processor speed 332 of the current node is less than or equal to the processor speed requirement 524 or 824 in the unit workload 158 multiplied by (the count plus one) or the free memory 334 of the current node is less than or equal to the memory requirement 526 or 826 of the unit workload 158 multiplied by (the count plus one), so control continues to block 1225 where the deployment service 156 saves the current node identifier and the count to the node identifier 630 and the number of placements 632, respectively in a new entry in the node deployments 160. Control then continues to block 1230 where the deployment service 156 sets the current node identifier to be the next node identifier in the servers description 152 that has a cloud identifier equal to the identifier of the target cloud. Control then continues to block 1235 where the deployment service 156 determines whether the current node identifier exists, i.e., the deployment service 156 determines whether or not all of the nodes identified by the node identifiers in the servers description 152 have been processed by the loop that starts at block 1210 and ends at block 1235. If the determination at block 1235 is true, then the current node identifier exists and the current node identified by the current node identifier remains to be processed by the loop, so control returns to block 1210 where the deployment service 156 begins processing the next current node, as previously described above.

If the determination at block 1235 is false, then the current node identifier does not exist and all nodes in the servers description 152 have been processed by the loop, so control exits the loop and continues to block 1240 where the deployment service 156 calculates the average number of placements to be the sum of the placements 632 for all nodes in the node deployments 160. The deployment service 156 stores the average number of the placements to the average number 640 in the node deployments 160. Control then continues to block 1299 where the logic of FIG. 12 returns.

Figure 13:
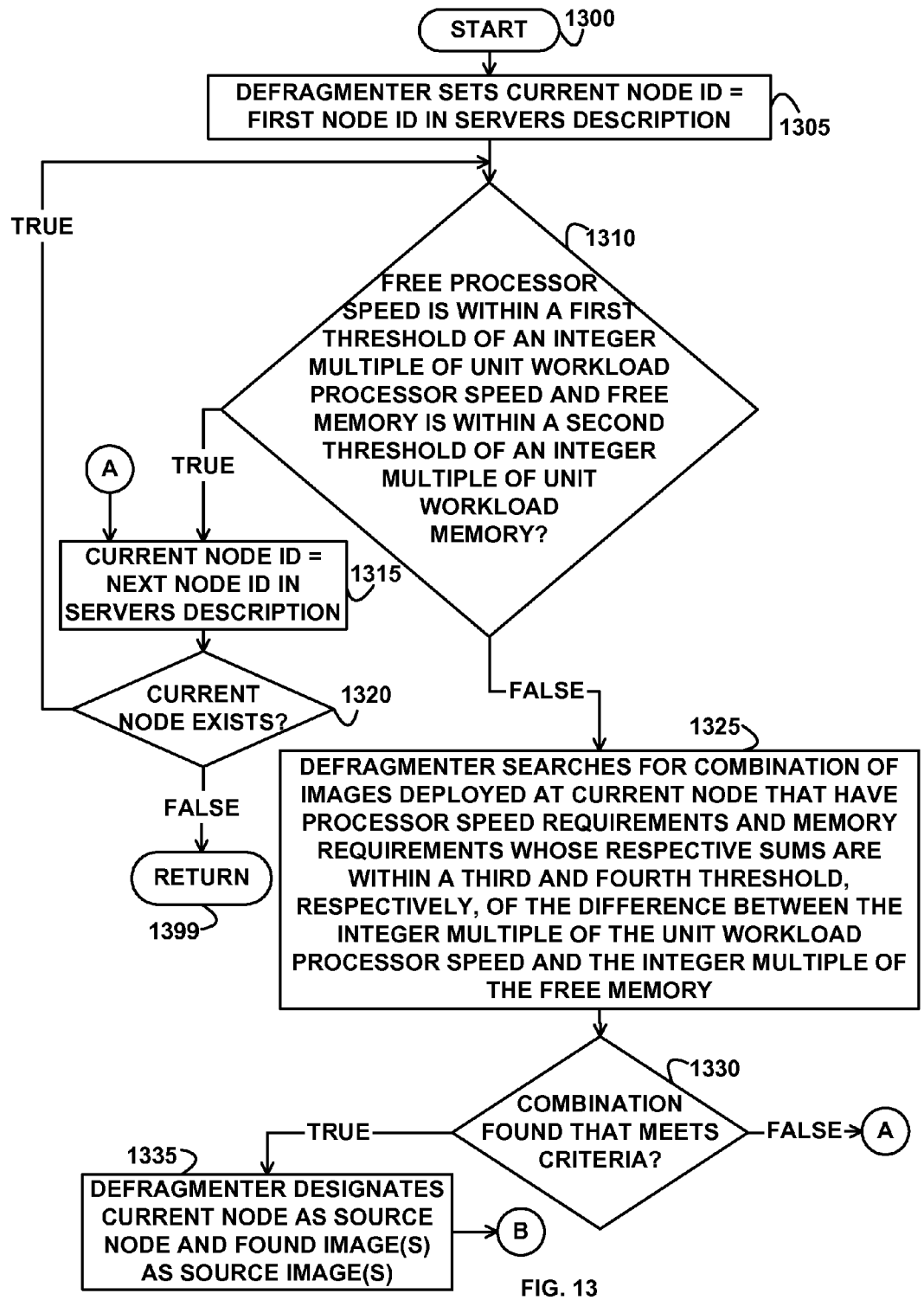
FIG. 13 depicts a flowchart of example processing for defragmenting deployed images, according to an embodiment of the invention.
Figure 14:
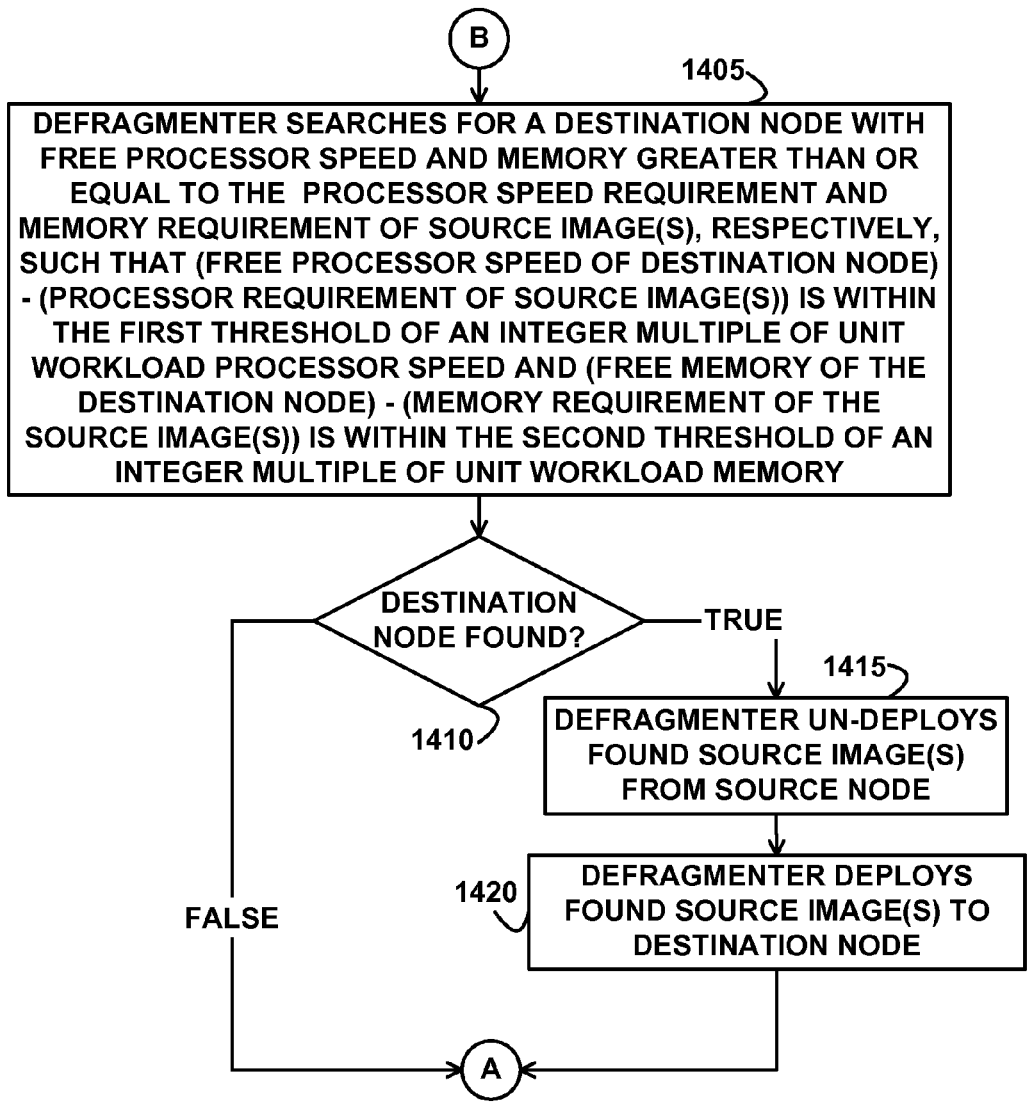
FIG. 14 depicts a flowchart of example processing for moving deployed images between servers, according to an embodiment of the invention.

FIG. 13 depicts a flowchart of example processing for defragmenting deployed images, according to an embodiment of the invention. The defragmenter 164 un-deploys or removes images from the server computer system nodes that cause the free processor speed 332 in the server computer system node to be approximately (within a threshold amount) an integer multiple of the unit workload processor speed 524 or 824 and cause the free memory 334 in the server computer system node to be approximately an integer multiple of the unit workload memory 526 or 826. For example, the server computer system node B (represented by the entry 304 in the servers description 152 of FIG. 3) has a free processor speed 332 of 4000 MIPs and a free memory amount of 4 GB, which are approximately integer multiples of 3500 MIPs (unit workload processor speed 524) and 4.8 GB (unit workload memory 526), respectively, so in an embodiment, the defragmenter 164 does not un-deploy any images from the server computer system node B 132-2.

As another example, the server computer system node G (represented by the entry 314 in the servers description 152 of FIG. 3) has a free processor speed 332 of 1000 MIPs and a free memory 334 of 2 GB, which are both, in an embodiment, not approximately integer multiples of the unit workload speed 524 and memory 526, so the defragmenter 164 searches for a combination of images to un-deploy from the computer system node G 132-7 that have processor speed requirements 422 and memory requirements 424 (FIG. 4) that respectively total approximately 2500 MIPs (3500−1000) and 2.8 GB (4.8−2).

Control begins at block 1300. Control then continues to block 1305 where the defragmenter 164 sets the current node identifier to be the first node identifier in the servers description 152. Control then continues to block 1310 where the defragmenter 164 determines whether the free processor speed 332 at the current server computer system node identified by the current node identifier is within a first threshold amount of a first integer multiple of the unit workload processor speed 524 or 824 (the integer multiple of the unit workload processor speed minus the free processor speed is less than or equal to the first threshold amount) and the free memory 334 at the current node is within a second threshold amount of a second integer multiple of the unit workload memory 526 or 826 (the integer multiple of the unit workload memory minus the free memory amount is less than or equal to the second threshold amount). The first integer multiple and the second integer multiple may be identical but are not necessarily identical. In various embodiments, the thresholds are received from a user interface, read from a memory location as predetermined constants, or determined dynamically.

If the determination at block 1310 is true, then the free processor speed 332 of the current server computer system node is within a first threshold amount of an integer multiple of the unit workload processor speed requirement 524 or 824 (the integer multiple of the unit workload processor speed minus the free processor speed is less than or equal to the first threshold amount) and the free memory 334 is within a second threshold amount of an integer multiple of the unit workload memory requirement 526 or 826 (the integer multiple of the unit workload memory minus the free memory amount is less than or equal to the second threshold amount), so control continues to block 1315 where the defragmenter 164 sets the current node identifier to be the next node identifier in the servers description 152 and does not designate the current node as a source node and does not remove or un-deploy images from the current node. Control then continues to block 1320 where the defragmenter 164 determines whether the current node identifier exists. If the determination at block 1320 is true, then current node identifier exists and not all node identifiers in the servers description 152 have been processed by the logic of FIG. 13, so control returns to block 1310 where the defragmenter 164 begins processing the next current node, as previously described above.

If the determination at block 1320 is false, then the current node identifier does not exist, the logic of block 1315 has reached the end of the servers description 152, and all node identifiers in the servers description 152 have been processed by the logic of FIG. 13, so control continues to block 1399 where the logic of FIG. 13 returns. If the determination at block 1310 is false, then the free processor speed 332 of the current server computer system node is not within the first threshold amount of an integer multiple of the unit workload processor speed 524 or 824 (the integer multiple of the unit workload processor speed minus the free processor speed is greater than the first threshold amount) or the free memory 334 is not within a second threshold amount of an integer multiple of the unit workload memory 526 or 826 (the integer multiple of the unit workload memory requirement minus the free memory amount is greater than the second threshold amount), so control continues to block 1325 where the defragmenter 164 searches for a combination of images deployed at the current node identified by the current node identifier that have processor speed requirements 422 and memory requirements 424 whose respective sums are within third and fourth threshold amounts, respectively, of the difference between the multiple of the unit workload processor speed 524 or 824 and the multiple of the free memory 526 or 826, respectively. That is, the defragmenter 164 searches for a combination of images deployed at the current node, where the multiple of the unit workload processor speed requirement 524 or 824 minus the sum of the processor speed requirements 422 of the combination of images deployed at the current node is less than or equal to a third threshold amount and a multiple of the unit workload memory requirement 526 or 826 minus the sum of the memory requirements 424 of the combination of images deployed at the current node is less than or equal to a fourth threshold amount.

Control then continues to block 1330 where the defragmenter 164 determines whether a combination of the images was found that meets the search criteria of block 1325. If the determination at block 1330 is true, then the defragmenter 164 found a combination of images deployed at the current node identified by the current node identifier that have processor speed requirements and memory requirements whose respective sums are within third and fourth threshold amounts, respectively, of the difference between the multiple of the unit workload processor speed and the multiple of the free memory, so control continues to block 1335 where the defragmenter 164 designates the current server computer system node as a source node and the found image(s) as source image(s), which are candidates to be moved to another server computer system node in the same cloud. Control then continues to block 1405 of FIG. 14 where the defragmenter 164 searches for a destination node in the same cloud as the source node with a free processor speed and a free memory amount that are greater than or equal to the processor speed requirement and memory requirement of the source image(s), respectively, such that the free processor speed of the destination node minus the sum of the processor requirements of the source image is within the first threshold amount of an integer multiple of the unit workload processor speed and the free memory amount of the destination node minus the sum of the memory requirements of the source image is within the second threshold amount of an integer multiple of the unit workload memory amount. That is, the defragmenter 164 searches for a destination node in the same cloud as the source node with a free processor speed and a free memory amount that are greater than or equal to the processor speed requirement and memory requirement of the source image(s), respectively, such that an integer multiple of the unit workload processor speed minus the free processor speed of the destination node minus the sum of the processor requirements of the source image is less than or equal to the first threshold amount and an integer multiple of the unit workload memory amount minus the free memory amount of the destination node minus the sum of the memory requirements of the source image is less than or equal to the second threshold amount.

Control then continues to block 1410 where the defragmenter 164 determines whether the search done by the processing illustrated in block 1405 found a destination node. If the determination of block 1410 is true, then the search found a destination node, so control continues to block 1415 where the defragmenter 164 un-deploys, uninstalls, deletes, and/or stops the execution of the found image or combination of images from the current node. Control then continues to block 1420 where the defragmenter 164 deploys, stores, configures, and/or installs the found source image(s) to the destination node, where the found source image(s) begin executing. Control then returns to block 1315 of FIG. 13, where the defragmenter 164 sets the current node identifier to be the next node identifier in the servers description 152, as previously described above. If the determination of block 1410 is false, then the search did not find a destination node, so the defragmenter refrains from un-deploying the source image(s) from the source node and refrains from deploying the source image(s) to another node, so control returns to block 1315 of FIG. 13, as previously described above.

If the determination at block 1330 is false, then the defragmenter 164 did not find a combination of images deployed at the current node identified by the current node identifier that have processor speed requirements and memory requirements whose respective sums are within third and fourth threshold amounts, respectively, of the difference between the multiple of the unit workload processor speed and the multiple of the free memory, so control returns to block 1315 where the defragmenter 164 sets the current node identifier to be the next node identifier in the servers description 152, as previously described above.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
   calculating a unit workload comprising an average processor speed required by execution of a plurality of images and an average memory amount required by the execution of the plurality of images;
   determining whether an integer multiple of the average processor speed required by the execution of the plurality of images minus a free processor speed at a source computer is greater than a first threshold amount, an integer multiple of the average memory amount required by the execution of the plurality of images minus a free memory amount at the source computer is greater than a second threshold amount, the integer multiple of the average processor speed required minus a processor speed requirement of a source image at the source computer is less than a third threshold amount, and the integer multiple of the average memory required minus a memory requirement of the source image at the source computer is less than a fourth threshold amount; and
   if the integer multiple of the average processor speed required by the execution of the plurality of images minus the free processor speed at the source computer is greater than the first threshold amount, the integer multiple of the average memory amount required by the execution of the plurality of images minus the free memory amount at the source computer is greater than the second threshold amount, the integer multiple of the average processor speed required minus the processor speed requirement of the source image at the source computer is less than the third threshold amount, and the integer multiple of the average memory required minus the memory requirement of the source image at the source computer is less than the fourth threshold amount, moving deployment of the source image, via computer-implemented logic, from the source computer to a destination computer.

2. The method of claim 1, further comprising:
   determining whether the destination computer has a free processor speed greater than the processor speed requirement of the source image and a free memory amount greater than the memory requirement of the source image, an integer multiple of the average processor speed minus the free processor speed of the destination computer minus the processor speed requirement of the source image is less than the first threshold amount and an integer multiple of the average memory amount required minus the free memory amount of the destination computer minus the memory requirement of the source image is less than the second threshold amount; and
   if the destination computer has the free processor speed greater than the processor speed requirement of the source image and the free memory amount greater than the memory requirement of the source image, the integer multiple of the average processor speed minus the free processor speed of the destination computer minus the processor speed requirement of the source image is less than the first threshold amount and the integer multiple of the average memory amount required minus the free memory amount of the destination computer minus the memory requirement of the source image is less than the second threshold amount, moving the deployment of the source image from the source computer to the destination computer.

3. The method of claim 2, wherein the source image is one of the plurality of images.

4. The method of claim 2, wherein the moving the deployment of the source images from the source computer to the destination computer further comprises stopping execution of the source image at the source computer and starting execution of the source image at the destination computer.

5. The method of claim 1, wherein the calculating further comprises:
calculating a weighted average of the average processor speed required by execution of a plurality of images and a weighted average of the average memory amount required by the execution of the plurality of images, wherein the weighted average of the average processor speed and the weighted average of the average memory amount are weighted in proportion to a number of times that a user requested deployment of the plurality of images.

6. The method of claim 1, further comprising:
calculating a number of images with average resource requirements represented by the unit workload that are deployable to each computer that is a member of a cloud, wherein the number of the images multiplied by the average processor speed required is less than or equal to the free processor speed of each computer that is the member of the cloud and the number of the images multiplied by the average memory required is less than or equal to the free memory amount at each computer that is the member of the cloud; and
displaying the number of the images with the average resource requirements represented by the unit workload that are deployable to each computer that is the member of the cloud.

7. The method of claim 1, further comprising:
determining whether the integer multiple of the average processor speed required by the execution of the plurality of images minus a free processor speed at the source computer is less than the first threshold amount and the integer multiple of the average memory amount required by the execution of the plurality of images minus a free memory amount at the source computer is less than a second threshold amount; and
if the integer multiple of the average processor speed required by the execution of the plurality of images minus the free processor speed at the source computer is less than the first threshold amount and the integer multiple of the average memory amount required by the execution of the plurality of images minus the free memory amount at the source computer is less than the second threshold amount, refraining from moving deployment of the source image from the source computer to the destination computer.

8. A non-transitory computer-readable storage medium encoded with instructions, wherein the instructions when executed comprise:
calculating a unit workload comprising an average processor speed required by execution of a plurality of images and an average memory amount required by the execution of the plurality of images;
determining whether an integer multiple of the average processor speed required by the execution of the plurality of images minus a free processor speed at a source computer is greater than a first threshold amount, an integer multiple of the average memory amount required by the execution of the plurality of images minus a free memory amount at the source computer is greater than a second threshold amount, the integer multiple of the average processor speed required minus a processor speed requirement of a source image at the source computer is less than a third threshold amount, and the integer multiple of the average memory required minus a memory requirement of the source image at the source computer is less than a fourth threshold amount; and
if the integer multiple of the average processor speed required by the execution of the plurality of images minus the free processor speed at the source computer is greater than the first threshold amount, the integer multiple of the average memory amount required by the execution of the plurality of images minus the free memory amount at the source computer is greater than the second threshold amount, the integer multiple of the average processor speed required minus the processor speed requirement of the source image at the source computer is less than the third threshold amount, and the integer multiple of the average memory required minus the memory requirement of the source image at the source computer is less than the fourth threshold amount, moving deployment of the source image from the source computer to a destination computer.

9. The non-transitory computer-readable storage medium of claim 8, further comprising:
determining whether the destination computer has a free processor speed greater than the processor speed requirement of the source image and a free memory amount is greater than the memory requirement of the source image, an integer multiple of the average processor speed minus the free processor speed of the destination computer minus the processor speed requirement of the source image is less than the first threshold amount and an integer multiple of the average memory amount required minus the free memory amount of the destination computer minus the memory requirement of the source image is less than the second threshold amount; and
if the destination computer has the free processor speed greater than the processor speed requirement of the source image and the free memory amount greater than the memory requirement of the source image, the integer multiple of the average processor speed minus the free processor speed of the destination computer minus the processor speed requirement of the source image is less than the first threshold amount and the integer multiple of the average memory amount required minus the free memory amount of the destination computer minus the memory requirement of the source image is less than the second threshold amount, moving the deployment of the source image from the source computer to the destination computer.

10. The non-transitory computer-readable storage medium of claim 9, wherein the source image is one of the plurality of images.

11. The non-transitory computer-readable storage medium of claim 9, wherein the moving the deployment of the source images from the source computer to the destination computer further comprises stopping execution of the source image at the source computer and starting execution of the source image at the destination computer.

12. The non-transitory computer-readable storage medium of claim 8, wherein the calculating further comprises:
    calculating a weighted average of the average processor speed required by execution of a plurality of images and a weighted average of the average memory amount required by the execution of the plurality of images, wherein the weighted average of the average processor speed and the weighted average of the average memory amount are weighted in proportion to a number of times that a user requested deployment of the plurality of images.

13. The non-transitory computer-readable storage medium of claim 8, further comprising:
    calculating a number of images with average resource requirements represented by the unit workload that are deployable to each computer that is a member of a cloud, wherein the number of the images multiplied by the average processor speed required is less than or equal to the free processor speed of each computer that is the member of the cloud and the number of the images multiplied by the average memory required is less than or equal to the free memory amount at each computer that is the member of the cloud; and
    displaying the number of the images with the average resource requirements represented by the unit workload that are deployable to each computer that is the member of the cloud.

14. The non-transitory computer-readable storage medium of claim 8, further comprising:
    determining whether the integer multiple of the average processor speed required by the execution of the plurality of images minus a free processor speed at the source computer is less than the first threshold amount and the integer multiple of the average memory amount required by the execution of the plurality of images minus a free memory amount at the source computer is less than a second threshold amount; and
    if the integer multiple of the average processor speed required by the execution of the plurality of images minus the free processor speed at the source computer is less than the first threshold amount and the integer multiple of the average memory amount required by the execution of the plurality of images minus the free memory amount at the source computer is less than the second threshold amount, refraining from moving deployment of the source image from the source computer to the destination computer.

15. A computer system, comprising:
    a processor; and
    memory communicatively coupled to the processor, wherein the memory is encoded with instructions that when executed on the processor comprise:
    calculating a unit workload comprising an average processor speed required by execution of a plurality of images and an average memory amount required by the execution of the plurality of images,
    determining whether an integer multiple of the average processor speed required by the execution of the plurality of images minus a free processor speed at a source computer is greater than a first threshold amount, an integer multiple of the average memory amount required by the execution of the plurality of images minus a free memory amount at the source computer is greater than a second threshold amount, the integer multiple of the average processor speed required minus a processor speed requirement of a source image at the source computer is less than a third threshold amount, and the integer multiple of the average memory required minus a memory requirement of the source image at the source computer is less than a fourth threshold amount, a destination computer has a free processor speed greater than the processor speed requirement of the source image and a free memory amount is greater than the memory requirement of the source image, an integer multiple of the average processor speed minus the free processor speed of the destination computer minus the processor speed requirement of the source image is less than the first threshold amount and an integer multiple of the average memory amount required minus the free memory amount of the destination computer minus the memory requirement of the source image is less than the second threshold amount, and
    if the integer multiple of the average processor speed required by the execution of the plurality of images minus the free processor speed at the source computer is greater than the first threshold amount, the integer multiple of the average memory amount required by the execution of the plurality of images minus the free memory amount at the source computer is greater than the second threshold amount, the integer multiple of the average processor speed required minus the processor speed requirement of the source image at the source computer is less than the third threshold amount, and the integer multiple of the average memory required minus the memory requirement of the source image at the source computer is less than the fourth threshold amount, the destination computer has the free processor speed greater than the processor speed requirement of the source image and the free memory amount is greater than the memory requirement of the source image, the integer multiple of the average processor speed minus the free processor speed of the destination computer minus the processor speed requirement of the source image is less than the first threshold amount and the integer multiple of the average memory amount required minus the free memory amount of the destination computer minus the memory requirement of the source image is less than the second threshold amount, moving the deployment of the source image from the source computer to the destination computer.

16. The computer system of claim 15, wherein the source image is one of the plurality of images.

17. The computer system of claim 15, wherein the moving the deployment of the source images from the source computer to the destination computer further comprises stopping execution of the source image at the source computer and starting execution of the source image at the destination computer.

18. The computer system of claim 15, wherein the calculating further comprises:
    calculating a weighted average of the average processor speed required by execution of a plurality of images and a weighted average of the average memory amount required by the execution of the plurality of images, wherein the weighted average of the average processor speed and the weighted average of the average memory amount are weighted in proportion to a number of times that a user requested deployment of the plurality of images.

19. The computer system of claim 15, wherein the instructions further comprise:
- calculating a number of images with average resource requirements represented by the unit workload that are deployable to each computer that is a member of a cloud, wherein the number of the images multiplied by the average processor speed required is less than or equal to the free processor speed of each computer that is the member of the cloud and the number of the images multiplied by the average memory required is less than or equal to the free memory amount at each computer that is the member of the cloud; and
- displaying the number of the images with the average resource requirements represented by the unit workload that are deployable to each computer that is the member of the cloud.

20. The computer system of claim 15, further comprising:
- determining whether the integer multiple of the average processor speed required by the execution of the plurality of images minus a free processor speed at a source computer is less than the first threshold amount and the integer multiple of the average memory amount required by the execution of the plurality of images minus a free memory amount at the source computer is less than a second threshold amount; and
- if the integer multiple of the average processor speed required by the execution of the plurality of images minus the free processor speed at the source computer is less than the first threshold amount and the integer multiple of the average memory amount required by the execution of the plurality of images minus the free memory amount at the source computer is less than the second threshold amount, refraining from moving deployment of the source image from the source computer to the destination computer.

* * * * *